(12) United States Patent
Abd Al Hadi et al.

(10) Patent No.: US 11,411,849 B1
(45) Date of Patent: Aug. 9, 2022

(54) IMPLEMENTING A TIERED CACHE TOPOLOGY WITH ANYCAST NETWORKS

(71) Applicant: CLOUDFLARE, INC., San Francisco, CA (US)

(72) Inventors: Zaidoon Abd Al Hadi, Seattle, WA (US); Samantha Aki Shugaeva, Palo Alto, CA (US); Yuchen Wu, Pacifica, CA (US); Brian C. Bradley, San Francisco, CA (US)

(73) Assignee: Cloudflare, Inc., San Francisco, CA (US)

( * ) Notice: Subject to any disclaimer, the term of this patent is extended or adjusted under 35 U.S.C. 154(b) by 0 days.

(21) Appl. No.: 17/344,597

(22) Filed: Jun. 10, 2021

(51) Int. Cl.
*H04L 43/0864* (2022.01)
*H04L 43/067* (2022.01)
*H04L 67/563* (2022.01)
*H04L 45/12* (2022.01)
*H04L 45/121* (2022.01)
*H04L 67/101* (2022.01)

(52) U.S. Cl.
CPC ........ *H04L 43/0864* (2013.01); *H04L 43/067* (2013.01); *H04L 45/121* (2013.01); *H04L 45/123* (2013.01); *H04L 45/126* (2013.01); *H04L 67/101* (2013.01); *H04L 67/2814* (2013.01)

(58) Field of Classification Search
CPC . H04L 43/0864; H04L 43/067; H04L 45/121; H04L 45/123; H04L 45/126; H04L 67/2814; H04L 67/101
See application file for complete search history.

(56) References Cited

U.S. PATENT DOCUMENTS

| | | | | |
|---|---|---|---|---|
| 2010/0146038 | A1* | 6/2010 | Hajiaghayi | H04L 67/288 709/203 |
| 2011/0282997 | A1* | 11/2011 | Prince | H04L 63/1433 709/226 |
| 2021/0075729 | A1* | 3/2021 | Fedorov | H04L 43/0864 |

OTHER PUBLICATIONS

Bradley, Tiered Cache Smart Topology, Cloudflare Inc., Feb. 18, 2021, 12 pages, downloaded at: https://blog.cloudflare.com/tiered-cache-smart-topology/.
Lalkaka, Introducing Argo—A faster, more reliable, more secure Internet for everyone, Cloudflare Inc., May 18, 2017, 9 pages, downloaded at: https://blog.cloudflare.com/argo/.

(Continued)

Primary Examiner — Abdulkader M Alriyashi
(74) Attorney, Agent, or Firm — NDWE, LLP

(57) ABSTRACT

A control server receives probe data from a plurality of data centers indicating measured latencies with a first IP address associated with an origin server. The control server sums the measured latencies of a first data center having a lowest measured latency and a second data center. When the sum is below a threshold value, the control server determines the IP address to be an anycast IP address and selects a proper subset of the plurality of data centers as proxying data centers for other data centers in the plurality of data centers. When the sum is not below the threshold value, the control server determines the IP address to not be an anycast IP address and selects the first data center having the lowest measure latencies as the proxying data center for other data centers in the plurality of data centers.

23 Claims, 6 Drawing Sheets

(56) References Cited

OTHER PUBLICATIONS

Cicalese et al., A Fistful of Pings: Accurate and Lightweight Anycast Enumeration and Geolocation, IEEE, 2015 IEEE Conference on Computer Communications (INFOCOM), Apr. 26-May 1, 2015, 9 pages.

Cicalese et al., Latency-Based Anycast Geolocation: Algorithms, Software, and Datasets. IEEE Journal on Selected Areas in Communications, Institute of Electrical and Electronics Engineers, Jun. 16, 2016, 34 (6), pp. 1889-1903.

* cited by examiner

| DATA CENTER | MEASURED LATENCY WITH IP ADDRESS OF ORIGIN SERVER | DISTANCE TO DATA CENTER 110A | DISTANCE TO DATA CENTER 110B | DISTANCE TO DATA CENTER 110C | DISTANCE TO DATA CENTER 110D |
| --- | --- | --- | --- | --- | --- |
| DATA CENTER 110D | 47 ms | 5.4 miles | 7.8 miles | 12 miles | |
| DATA CENTER 110B | 52 ms | 16 miles | | 10 miles | 7.8 miles |
| DATA CENTER 110A | 55 ms | | 16 miles | 9.4 miles | 5.4 miles |
| DATA CENTER 110C | 161 ms | 9.4 miles | 10 miles | | 12 miles |

FIG. 2

IMPLEMENTING A TIERED CACHE TOPOLOGY WITH ANYCAST NETWORKS

FIELD

Embodiments of the invention relate to the field of network communications, and more specifically, to implementing a tiered cache topology with anycast networks.

BACKGROUND

Hosts are concerned with maintaining high security, performance, and reliability of their hosted resources, such as applications and web resources (e.g., websites). Network traffic related to resources can include requests to access, retrieve, and/or modify resources hosted by an origin server. As the popularity of a resource increases, so does the amount of network traffic that is directed to the origin server hosting the resource. Heavy traffic can affect the security, performance, and/or reliability of a resource. One way to mitigate the need for excessive requests to an origin server is to cache the resource so that instead of an origin server responding to every request, data centers around the world can retrieve requested resources from a cache that is geographically close to the requestor.

BRIEF DESCRIPTION OF THE DRAWINGS

The invention may best be understood by referring to the following description and accompanying drawings that are used to illustrate embodiments of the invention. In the drawings:

FIG. 2 illustrates an exemplary table of probe data according to some embodiments described herein;

DESCRIPTION OF EMBODIMENTS

Figure 1:
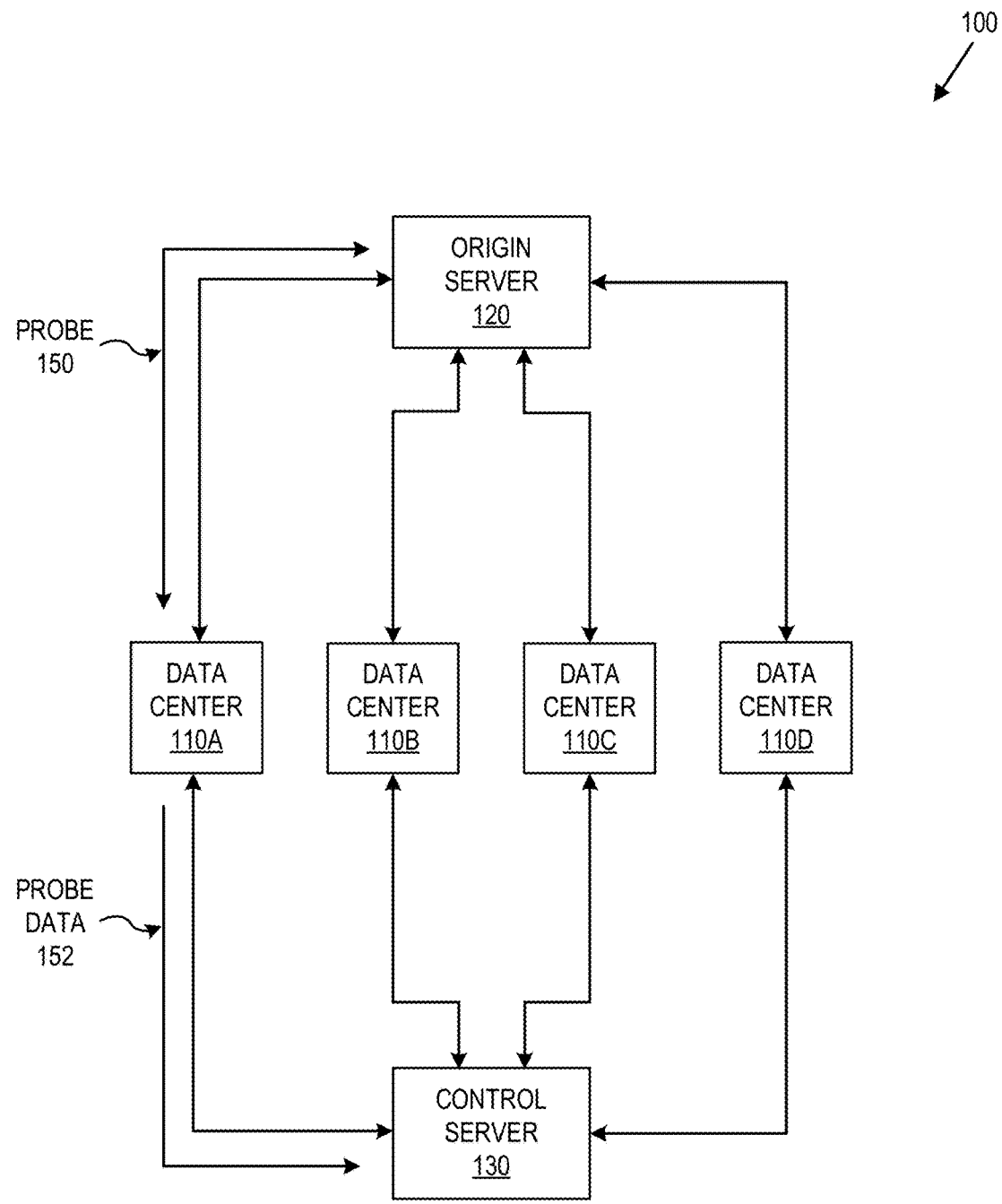
FIG. 1 illustrates an exemplary networked system according to some embodiments described herein.

Origin servers host resources that are accessible by various client devices through requests sent through data centers, proxy server, and other systems. When a client device requests to access resources hosted by an origin server, the response to the request can be served from either the origin server or from a cache associated with an intermediary handling the request.

The standard method for caching assets is to have each data act as a reverse proxy for an origin server, such that each data center can transmit requests to the origin server to access resources hosted by the origin server. However, this conventional solution can result in some potential problems. For example, in these schemes, a miss in any data center causes a request to the origin server for the resource. As a result, an origin server could potentially receive a request for a particular resource from every data center. This is because the data centers may be oblivious to each other, such that a first data center with a cache miss may send a request to the origin server even when the requested resource is cached in another data center or even in every other data center. Excessive requests being sent to an origin server can be both time-consuming, because retrieving data from an origin server takes longer than retrieving the same data from a cache, and wastes computing resources and bandwidth by placing a heavier load on origin servers.

One conventional solution is to reduce the number of data centers responsible for requesting resources from an origin server. For example, a tiered cache can improve cache hit ratios by allowing some data centers to serve as caches for lower-tiered data centers, with the higher-tiered data centers making requests to origin servers. This can result in the higher-tiered data centers operating as reverse proxies to the origin server for the lower-tiered data centers. The higher-tiered data centers can also function as caches for lower-tiered data centers. Once a proxying data center (e.g., a higher-tiered data center) makes one request to the origin server for a particular resource, the proxying data center can cache the resource locally. Subsequent requests from proxied lower-tiered data centers that are received by the proxying data center may not result in additional requests to the origin server as the resource will already be cached in the proxying data center and can be retrieved from there rather than from the origin server. This can result in fewer requests to the origin server being made overall. However, devising an optimal topology of data centers can be a challenge.

The embodiments described herein provide mechanisms for determining a tiered cache topology to minimize cache misses and minimize latency. The tiered cache topology is determined by using a data center selection algorithm to choose one or more data centers to act as proxying data centers for lower-tiered data centers according to an embodiment. In one embodiment, a control server receives probe data from a plurality of data centers. The probe data indicates measured latencies for each of the plurality of data centers with an IP address associated with an origin server. The control server determines a first data center of the plurality of data centers having a lowest measured latency with the IP address. The control server sums the measured latency of the first data center with a second data center and determines whether the IP address is an anycast IP address based on whether the summed latencies is less than a threshold value, where latencies below the threshold are not physically possible (e.g., faster than the speed of light). When the IP address is an anycast IP address, the control server selects a proper subset of the plurality of data centers regardless of the measured latencies from the probe data. When the IP address is not an anycast IP address, the control server selects the first data center, previously determined to be the data center with the lowest measured latency, as the proxying data center. Subsequently, the control server sends configuration data to the plurality of data centers indicating the selection of the proxying data center(s) to configure the topology of the data centers for handling requests for resources from the origin server. When a proxy server at one of the plurality of data centers receives a request to access a resource hosted by the origin server, the proxy server transmits the request to a proxying data center, which can either retrieve the resource from a cache or transmit the request to the origin server. The proxying data center can then send the requested resource back to the proxy server, which is then transmitted to the requesting client device.

Embodiments of the invention provide many technical advantages, in addition to addressing the deficiencies of previous solutions. For example, improvements to the processing of requests for resources hosted by an origin server can be realized by determining a tiered cache topology that configures data centers by using a data center selection algorithm that determines whether an IP address associated with the origin server is an anycast IP address. When measuring the latency between a data center and an origin server, if the IP address of the origin server is an anycast IP address, the measured latency will not be an accurate measurement of the latency to the origin, but instead only the latency to the edge of the anycast network. Because the data center with the lowest measured latency may not be a true indication of the measured latency to the origin server when the IP address is an anycast IP address, the data center selection algorithm selects one or more data centers to act as the proxying data centers. In such situations, in order to provide increased efficiencies in handling requests for resources, the data center selection algorithm can select at least one data center (e.g., a data center with a highest capacity) in each of a plurality of geographically distributed regions as the proxying data centers. Thus, systems employing a data center selection algorithm as described herein provide efficiencies in the time and resources used to retrieve or access resources hosted at origin servers, including origin servers behind anycast networks.

FIG. 1 illustrates an exemplary networked system according to some embodiments described herein. The exemplary networked system illustrated in FIG. 1 includes data centers 110A-D that are connected to an origin server 120 and a control server 130.

Examples of an origin server 120 include computing devices that may serve and/or generate network resources (e.g., web pages, images, word processing documents, PDF files movie files, music files, or other computer files). Origin server 120 may also be another edge server to the server that serves and/or generates network resources. Although not illustrated in FIG. 1, it should be understood that the network resources of origin server 120 may be stored separately from the device that responds to the requests.

In one embodiment, data centers 110A-D are geographic locations housing networking devices. In some embodiments, each of data centers 110A-D can include a plurality of edge server or proxy servers, routers, and other computing devices. In one embodiment, data centers 110A-D house computing devices that are configured to receive requests to access and/or modify the resources hosted by an origin server 120, and further receives responses to such requests with the requested resources from the origin server 120. For example, web traffic (e.g., HTTP requests/responses, HTTPS requests/responses, SPDY requests/responses, HTTP/2 requests, responses, etc.) for domains handled by the origin server 120 may be received at data centers 110A-D. The data centers 110A-D can be configured to periodically probe an IP address associated with an origin server 120. For example, data center 110A can send a probe 150 to origin server 120. In some embodiments, the probe 150 is a TCP handshake between an individual router or edge server within the data center 110A and the origin server 120 directed to the IP address associated with the origin server 120. Although as illustrated in FIG. 1, each of the data centers 110A-D are connected directly with the origin server 120, the probes from some data centers may pass through other server and/or data centers before reaching the origin server 120. In some embodiments, data centers 110A-D also collect data center to data center probe data. For example, data center 110A can collect probe data indicating the measured latencies between data center 110A and each of the other data centers (e.g., data centers 110B-D), data center 110B can collect probe data indicating the measured latencies between data center 110B and each of the other data centers (e.g., data centers 110A, 110C, and 110D), and so on.

The exemplary networked system 100 may also include control server 130, which may be owned or operated by the service. In some embodiments, control server 130 may receive the probe data from data centers 110A-D containing the results of the probe from each of the data centers with the IP address associated with the origin server 120. In some embodiments, the control server 130 can be configured to determine, from the received probe data, whether the probe between the data centers 110A-D and the origin server 120 indicate that the IP address associated with the origin server 120 is an anycast IP address. In some embodiments, the control server 130 determines that the IP address is an anycast IP address by summing the measured latencies of a data center with a lowest measured latency with each of the measured latencies of the data centers other than the data center with a lowest measured latency. In such embodiments, when the sum of the measure latencies is less than a threshold value, the control server 130 determines that the IP address associated with the origin server 120 is an anycast IP address. In some embodiments, the threshold value can be a value of time representing the theoretical minimum possible observable pair of latencies between the two data centers, where any value below the threshold value is physically impossible. For example, a value lower than the threshold value would indicate the packets traversed the distance at a speed greater than the speed of light. Because this is physically impossible, this is an indication that the IP address of the origin server 120 is an anycast IP address of a proxy server or edge server that is receiving messages on behalf of the origin server 120. In some embodiments, the threshold value can be different values for different pairs of data centers.

In some embodiments, based on its analysis of the probe data, the control server 130 can select one or more data centers to act as a proxying data center. For example, when the IP address associated with the origin server 120 is an anycast IP address, the control server 130 selects a proper subset of the data centers 110A-D as proxying data centers. When the IP address associated with the origin server 120 is not an anycast IP address, the control server 130 selects the data center having the lowest measured latency as the proxying data centers. After determining the proxying data centers, the control server 130 can send configuration data to the data centers 110A-D to configure the data centers based on the selected proxying data centers.

Figure 3:
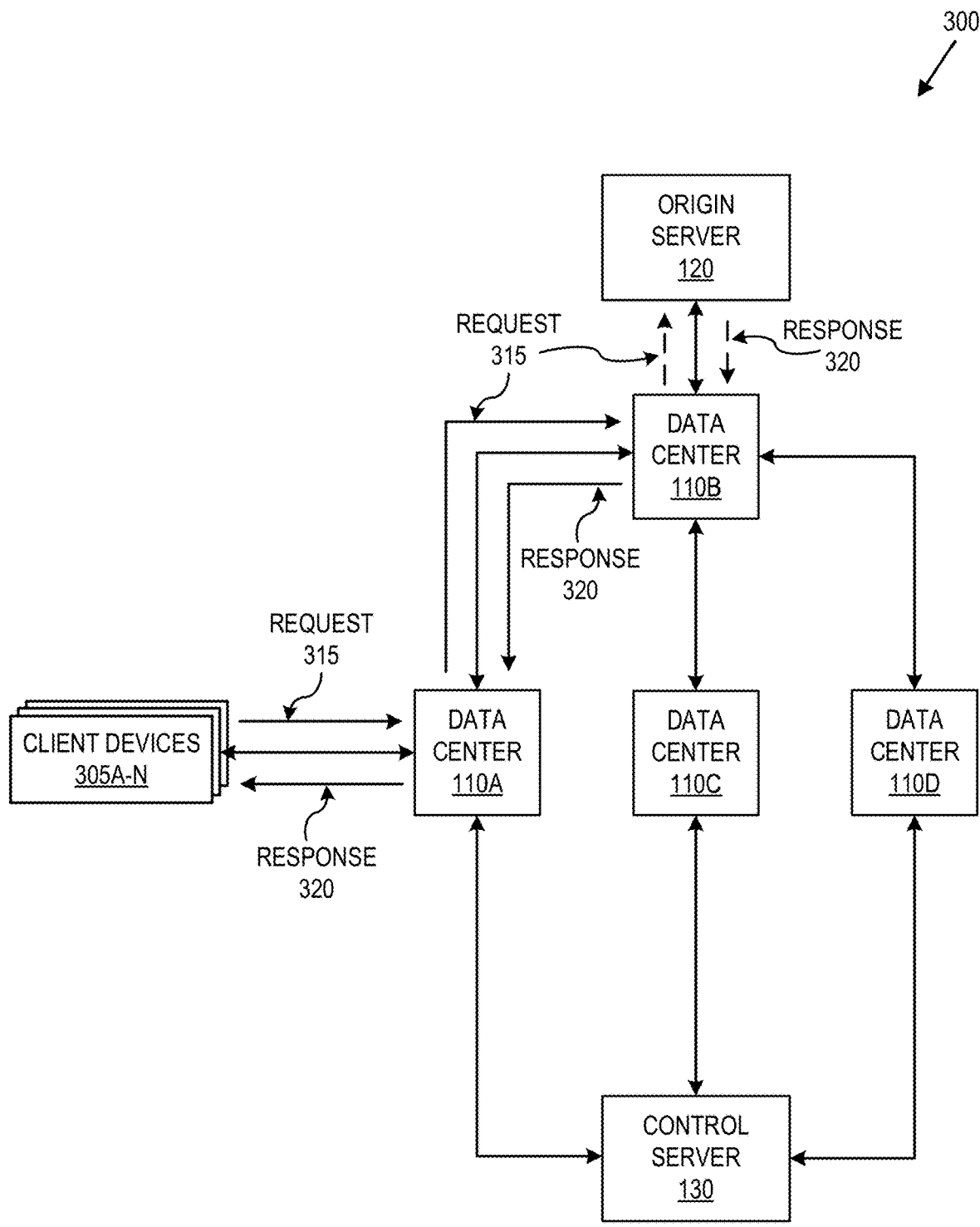
FIG. 3 illustrates an exemplary networked system configured based on probe data according to some embodiments described herein.

FIG. 3 illustrates an exemplary networked system configured based on probe data according to some embodiments described herein. The exemplary networked system 300 illustrated in FIG. 3 includes data centers 110A-D, an origin server 120, a control server 130, and client devices 305A-N. The exemplary networked system 300 includes the data centers 110A-D situated between client devices 305A-N and origin server 120.

As illustrated in FIG. 3, data center 110B has been configured (e.g., based on the probe data described with respect to FIG. 1) to act as a proxying data center for at least data centers 110A, 110C, and 110D. Although FIG. 3 depicts a single proxying data center, in other example configurations, there may be other proxying data centers in addition to, or instead of, data center 110B.

Examples of client devices 305A-N include computing devices (e.g., laptops, workstations, smartphones, palm tops, mobile phones, tablets, gaming systems, set top boxes, wearable devices, electronic devices, etc.) that are capable of transmitting and/or receiving network traffic. In one embodiment, each of client devices 305A-N executes a client network application that is capable of transmitting and/or receiving network traffic. For example, client the network application may be a web browser or other application that can send requests to access and display network resources (e.g., web pages, images, word processing documents, PDF files, movie files, music files, or other computer files).

As depicted in FIG. 3, one of the data centers (e.g., data center 110A) receives a request 315 from one of the client devices 305A-N. In one embodiment, data center 110A is configured to receive requests to access and/or modify the resources hosted by the origin server 120, and further receives responses (e.g., response 320) to such requests with the requested resources from the origin servers 120. As further illustrated in FIG. 3, data center 110A is configured to send the request 315 to data center 110B, which has been configured as a proxying data center for data center 110A. In this configuration, requests to access resources hosted by origin server 120 that are received by data center 110A are transmitted to data center 110B instead of being transmitted directly to the origin server 120. Further, response messages (e.g., response 320) that include the requested resource are sent from the origin server 120 through data center 110B, or alternatively, directly from data center 110B if the requested resource is accessible in a cache associated with data center 110B. In some embodiments, where the requested resource is stored in a cache associated with data center 110A, the resource can be served from the cache directly.

Figure 4:
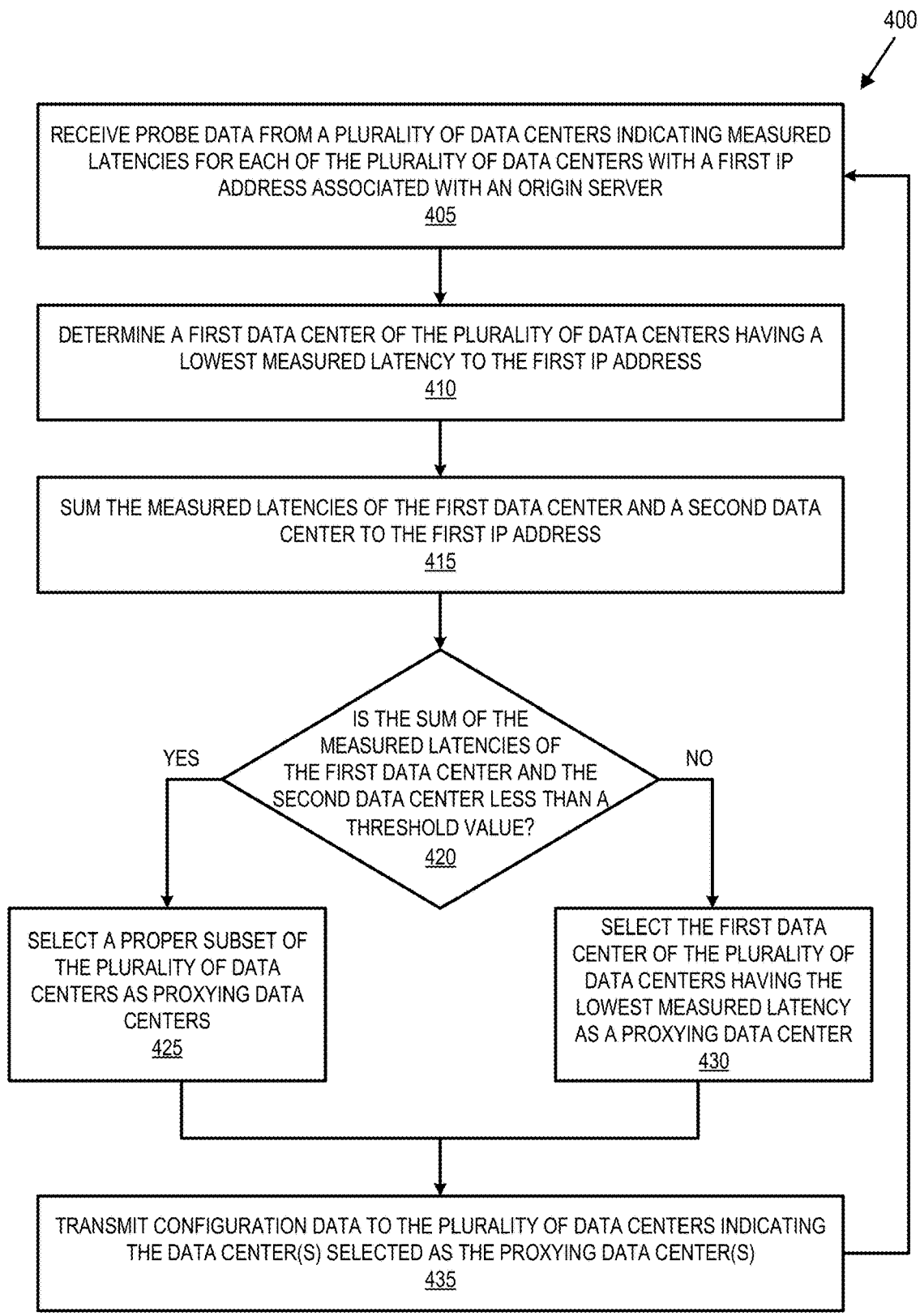
FIG. 4 is a flow diagram that illustrates exemplary operations for configuring a tiered data center topology according to an embodiment.

FIG. 4 is a flow diagram 400 that illustrates exemplary operations for configuring a tiered data center topology according to an embodiment. The operations of FIG. 4 will be described with reference to the exemplary embodiment of FIGS. 1-3. However, it should be understood that the operations of FIG. 4 can be performed by embodiments of the invention other than those discussed with reference to FIGS. 1-3, and the embodiments discussed with reference to FIGS. 1-3 can perform operations different than those discussed with reference to FIG. 4. The operations of FIG. 4 are described as being performed by a control server (e.g., control server 130 in FIG. 1). In other embodiments, the operations of FIG. 4 can be performed by a proxy server or another server other than the control server.

In operation 405, a control server receives probe data from a plurality of data centers indicating measured latencies for each of the plurality of data centers with a first IP address associated with an origin server. The latency to the first IP address associated with the origin server can be determined by probing that IP address. In some embodiments, each data center (e.g., data centers 110A-D) probes the origin server so that the latencies can be directly measured and the minimum can be found. For example, in FIG. 1, a probe 150 in the form of a TCP handshake is illustrated between data center 110A and origin server 120. Similar probes can be initiated between each of the other data centers 110B-D and the origin server 120. After generating the probe data (e.g., probe data 152), each of the plurality of data centers 110A-D can send their probe data to the control server 130. While in some embodiments, all data centers probe the origin server, in other embodiments, only a subset of the data centers probe the origin server. For example, the subset of the data centers can include only data centers above a specified size and having a number of connections above a specified number.

In some embodiments, the probe data can include data indicating the amount of time to perform the TCP handshake between one of the data centers and the origin server. For example, probe data 152 indicates the amount of time that was taken to perform the TCP handshake between data center 110A and the origin server 120.

In operation 410, the control server determines a first data center of the plurality of data centers having the lowest measured latency to the first IP address. For example, the control server uses the probe data to rank the plurality of data centers based on their measured latencies and identifies the data center with the lowest measured latency from the ranking.

FIG. 2 illustrates an exemplary table of probe data according to some embodiments described herein. Although FIG. 2 depicts four data centers (e.g., data centers 110A-D), other embodiments can include additional, fewer, and/or different data centers. As illustrated in FIG. 2, table 200 shows the measured latencies between data centers 110A-D and origin server 120, based on the probe data received by the control server 130. Table 200 also shows the distances between each pair of the data centers 110A-D. In some embodiments, the control server 130 can rank the measured latencies to identify the data center with the lowest measured latency. As shown in FIG. 2, the data center with the lowest measure latency is data center 110D at 47 milliseconds.

In operation 415, the control server sums the measured latency of the first data center to the first IP address and the measured latency of the second data center to the first IP address. In some embodiments, while the control server does not know the distance between any of the data centers and the origin server, the distances between data centers is known. For example, using the known distance between a first data center and a second data center, the control server can employ a data center selection algorithm to determine whether the first IP address is an anycast IP address. As part of the data center selection algorithm, the control server places the origin server at a point in between the first data center and the second data center. The control server can then determine the theoretical minimum possible observable pair of latencies between the origin server and the two data centers.

Typically, the measured latency between a data center to an IP address is the same as the latency to the origin server behind that IP address. However, when the IP address is an anycast IP address, this may not be the case. In anycast, multiple machines/servers can share an IP address regardless of where they are located, and packets directed to that IP address are typically routed to the closest server. If an anycast network is used to proxy an origin server, the apparent latency to the IP address for the origin server is the latency to the edge of the anycast network rather than the latency to the origin server. This means that real latency to the origin server may not be determined by probing. If the latencies are not representative of the actual latencies between data centers and the origin server, a data center selection algorithm would fail to select the single best proxying data center, which could adversely affect latencies for requests sent to the origin server. For example, suppose a cloud provider provides an IP address that actually routes to multiple data centers all over the world. Packets may be routed through private infrastructure to the correct destination once they enter the network. The lowest latency data center to this anycast IP address could potentially be on a different continent than the actual origin server. In such a scenario, the apparent latency from a data center to the IP address could not actually be trusted as a true measure of actual latency to the origin server.

In operation 420, the control server determines whether the sum of the measured latencies of the first data center and the second data center is less than a threshold value. In some embodiments, the threshold value is a time, where the sum of the measured latencies being below the threshold value indicates that the measured latency is less than what would be physically possible (e.g., a TCP handshake could not have traversed the distance within the amount of time elapsed).

Continuing the example, after determining the theoretical minimum possible observable pair of latencies between the origin server and the two data centers, the control server compares the theoretical minimum possible observable pair of latencies with the sum of the measured latencies from the probe data. When the sum of the measured latencies is less than the theoretical minimum possible observable pair of latencies, the control server determines that the IP address of the origin server is an anycast IP address. The control server can come to this conclusion because if the sum of the measured latencies is not a possible value (e.g., less than the theoretical minimum possible observable pair of latencies), the measured latencies are not representative of the actual latencies between the data center and the origin server. Conversely, when the sum of the measured latencies is not lower than the theoretical minimum possible observable pair of latencies, the control server assumes that the measured latencies are to the actual origin server and concludes that the IP address of the origin server is not an anycast IP address.

For example, the equation for determining the theoretical minimum possible observable pair of latencies, $Latency_{Min}$, between the data center with the lowest measured latency and another data center can be represented as follows:

$$\frac{\text{Distance Between } DataCenterLow \text{ and } DataCenterX}{\text{Maximum\_Speed}} = Latency_{Min}$$

where DataCenterLow is the data center with the lowest measured latency, DataCenterX is one of the other data centers other than the data center with the lowest measured latency, and Maximum_Speed is a value up to the speed of light (e.g., the speed of light in a fiber cable). After determining the theoretical minimum possible observable pair of latencies, $Latency_{Min}$, for the two data center, the control server can compare it to the sum of the measured latencies of DataCenterLow and DataCenterX, as follows:

$$Latency_{DataCenterLow} + Latency_{DataCenterX} < G \ Latency_{Min},$$

where $Latency_{DataCenterLow}$ is the measured latency for the data center with the lowest measured latency and $Latency_{DataCenterX}$ is the measured latency of one of the other data centers other than the data center with the lowest measured latency. If the sum of the measured latencies of DataCenterLow and DataCenterX is below the theoretical minimum possible observable pair of latencies, $Latency_{Min}$, the control server determines that the IP address is an anycast IP address.

The sum of the measured latencies of the first data center and the second data center being less than the threshold value indicates that the IP address is an anycast IP address. In such a case, a proper subset of the plurality of data centers is selected as proxying data centers. Thus, in operation 425, when the sum of the measured latencies of the first data center and the second data center is less than a threshold value, a proper subset of the plurality of data centers is selected as proxying data centers. In some embodiments, the proper subset of the plurality of data centers selected as the proxying data centers includes at least one data center in each of a plurality of geographically distributed regions. In such embodiments, the at least one data center in each of the plurality of geographically distributed regions is selected as one of the proper subset of the plurality of data centers based on the at least one data center having a greater capacity than other data centers in their respective geographically distributed region.

In operation 430, when the sum of the measured latencies of the first data center and the second data center is not less than a threshold value, the control server selects the first data center of the plurality of data centers that has the lowest measured latency as the proxying data center. The sum of the measured latencies of the first data center and the second data center being greater than or equal to the threshold value indicates that the IP address is not an anycast IP address. In response, in some embodiments, the control server then ranks the plurality of data centers based on their measured latencies from the probe data and identifies the data center with the lowest measured latency from the ranking as the proxying data center. In some embodiments, the control server further identifies the data center with a second lowest measured latency from the ranking as a fallback proxying data center. In some embodiments, the fallback proxying data center can assume the role of the proxying data center if the proxying data center is not functioning (e.g., due to maintenance or malfunction).

In operation 435, the control server transmits configuration data to the plurality of data centers indicating the one or more data centers selected as the proxying data center(s). For example, when the analysis of the probe data is performed by the control server 130, after determining the one or more proxying data centers, the control server 130 transmits configuration data to the data centers 110A-D indicating the selection of the one or more proxying data centers.

In some embodiments, the flow returns to operation 405 to receive updated or new probe data from the plurality of data centers that can be used by the control server to update selection of the proxying data center(s). For example, using the updated probe data, the control server can update the ranking of the measured latencies of the plurality of data centers.

In some embodiments, after receiving the configuration data, the data center(s) selected as proxying data centers is configured to communicate request messages and response messages between the origin server and other non-proxying data centers of the plurality of data centers. For example, as illustrated in FIG. 3, data center 110B is configured as the proxying data center. In addition, the other data centers (e.g., data centers 110A, 110C, and 110D) are configured to transmit requests they receive to and receive responses from data center 110B, instead of directly to/from the origin server 120.

Figure 5:
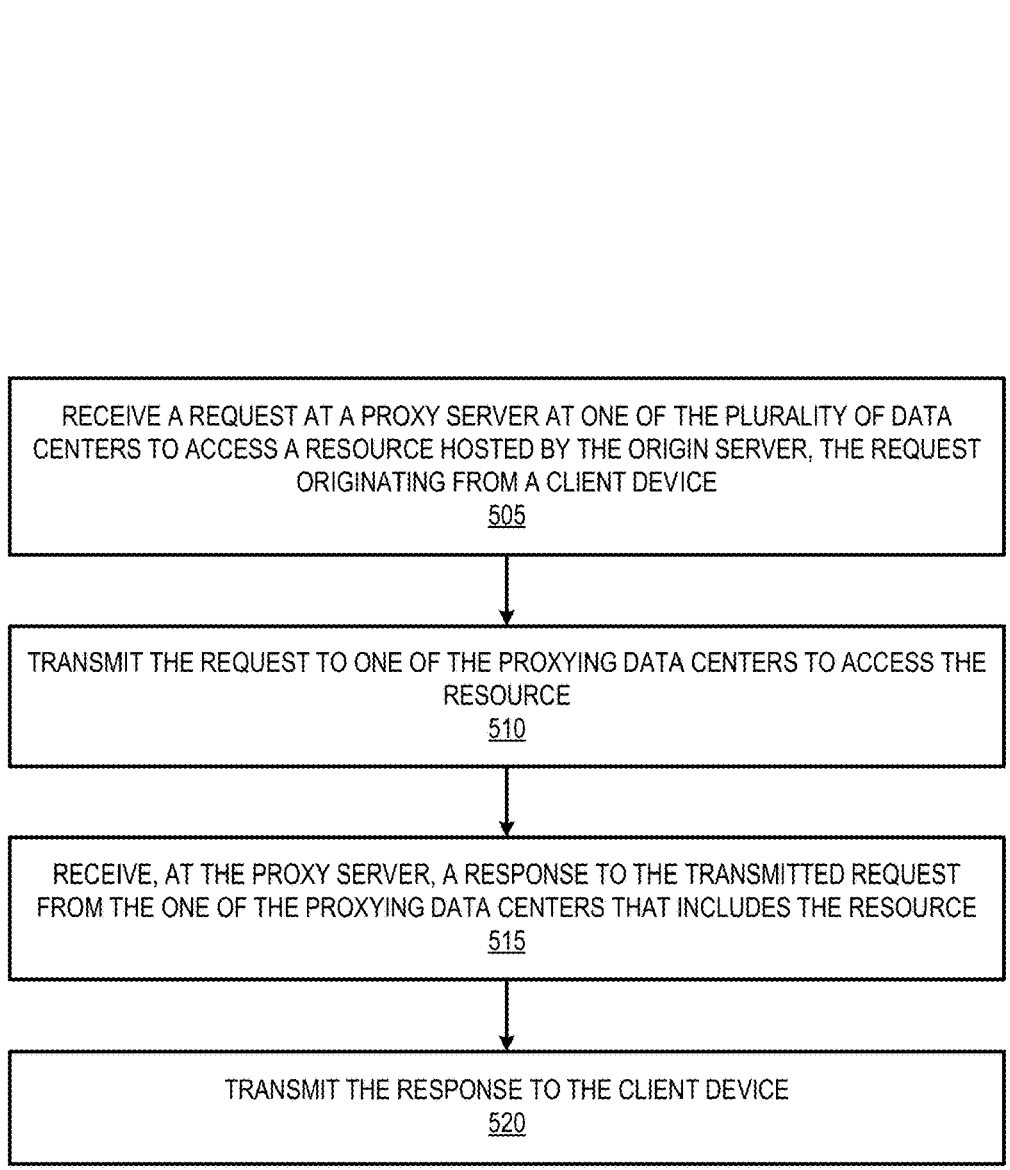
FIG. 5 is a flow diagram that illustrates exemplary operations for processing a request to access a resource hosted by an origin server through a proxying data center according to an embodiment.

In some embodiments, after transmitting the configuration data to the data centers (e.g., data centers 110A-D), the flow proceeds to operation 505 in FIG. 5 where one of the data centers receives a request from a client device to access a resource hosted by an origin server.

FIG. 5 is a flow diagram 500 that illustrates exemplary operations for processing a request to access a resource hosted by an origin server through a proxying data center according to an embodiment. The operations of FIG. 5 will be described with reference to the exemplary embodiment of FIG. 3. However, it should be understood that the operations of FIG. 5 can be performed by embodiments of the invention other than those discussed with reference to FIG. 3, and the embodiments discussed with reference to FIG. 3 can perform operations different than those discussed with reference to FIG. 5. The operations of FIG. 5 are described as being performed by a proxy center at a data center (e.g., data center 110A).

In operation 505, a proxy server at one of the plurality of data centers receives a request to access a resource hosted by the origin server. For example, data center 110A receives a request 315 from a client device (e.g., one of client devices 305A-N) to access a resource hosted by the origin server 120. In some embodiments, accessing the resource includes retrieving the resource from the origin server 120. For example, the proxy server can receive an HTTP "GET" request to access the resource, such as an HTML page, hosted by origin server 120.

In operation 510, the proxy server transmits the request 315 to one of the proxying data centers to access the resource. For example, data center 110A transmits the request 315 to data center 110B, the data center selected to be a proxying data center of the one or more proxying data centers based on the probe data analysis described with respect to FIG. 4. In some embodiments, the proxying data center determines whether the requested resource is stored in a cache associated with, or otherwise accessible by, data center 110B. When data center 110B determines that the requested resource is available in the cache, data center 110B retrieves the resource from the cache. In such embodiments, data center 110B can retrieve the requested resource from the cache without sending the request to origin server 120. When data center 110B determines that the requested resource is not available in the cache, or data center 110B cannot access the requested resource in the cache, data center 110B retrieves the requested resource from origin server 120. For example, data center 110B can send the HTTP request containing the "GET" request to origin server 120, and data center 110B can receive an HTTP response back from origin server 120.

In operation 515, the proxy server receives a response to the transmitted request from the one of the proxying data centers that includes the resource. In some embodiments, the proxying data center sends the response to the request containing the requested resource to the proxy server in data center 110A. Continuing the example, data center 110A receives the response 320 from data center 110B with the resource (e.g., either retrieved from the origin server 120 or from a cache associated with data center 110B).

In operation 520, the proxy server transmits the response to the client device. For example, the proxy server in data center 110A sends response 320 to the client device (e.g., the one of client devices 305A-N) that sent the request 315.

Figure 6:
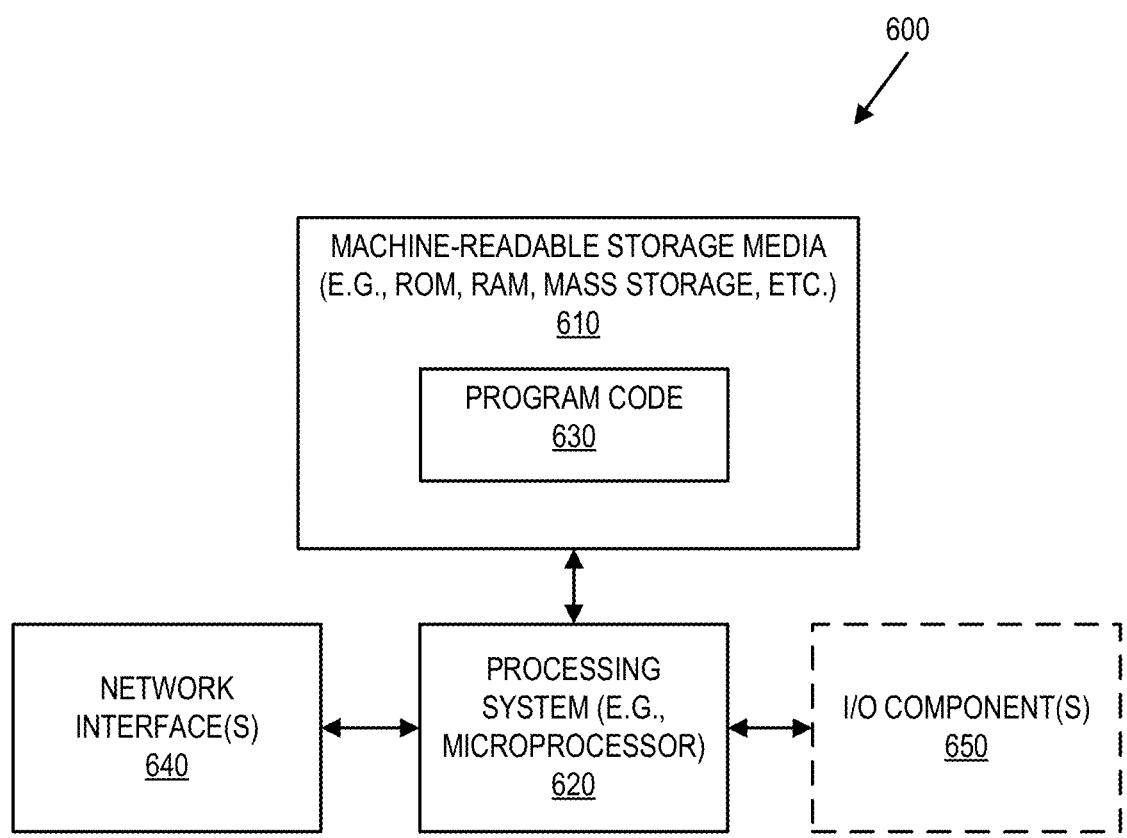
FIG. 6 illustrates a block diagram for an exemplary data processing system that may be used in some embodiments.

FIG. 6 illustrates a block diagram for an exemplary data processing system 600 that may be used in some embodiments. One or more such data processing systems 600 may be used to implement the embodiments and operations described with respect to the data centers, origin server, control server, or other electronic devices. The data processing system 600 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 610 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 620 (e.g., one or more processors and connected system components such as multiple connected chips). For example, the depicted machine-readable storage media 610 may store program code 630 that, when executed by the processor(s) 620, causes the data processing system 600 to perform any of the operations described herein.

The data processing system 600 also includes one or more network interfaces 640 (e.g., a wired and/or wireless interfaces) that allows the data processing system 600 to transmit data and receive data from other computing devices, typically across one or more networks (e.g., Local Area Networks (LANs), the Internet, etc.). The data processing system 600 may also include one or more input or output ("I/O") components 650 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices.

Additional components, not shown, may also be part of the system 600, and, in certain embodiments, fewer components than that shown in FIG. 6 may also be used in a data processing system 600. One or more buses may be used to interconnect the various components shown in FIG. 6.

Thus, an electronic device (e.g., a computer or a mobile client device) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the preceding description and the claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer-implemented method comprising:
   receiving probe data from a plurality of data centers indicating measured latencies for each of the plurality of data centers with a first IP address associated with an origin server, wherein a first data center of the plurality of data centers has a lowest measured latency to the first IP address;
   summing the measured latency of the first data center to the first IP address and the measured latency of a second data center of the plurality of data centers to the first IP address;
   determining that the first IP address associated with the origin server is an anycast IP address as a result of the summing of the measured latencies of the first data center and the second data center being less than a threshold value;
   responsive to the determining that the first IP address associated with the origin server is an anycast IP address, selecting a proper subset of the plurality of data centers as proxying data centers for traffic destined to the first IP address regardless of the measured latencies;
   transmitting configuration data to the plurality of data centers that indicates the selected proper subset of the plurality of data centers as the proxying data centers;
   receiving a request at a proxy server at one of the plurality of data centers to access a resource hosted by the origin server, the request originating from a client device;
   transmitting the request to one of the proxying data centers to access the resource, the access including retrieving the resource from the origin server;
   receiving, at the proxy server, a response to the transmitted request from the one of the proxying data centers that includes the resource; and
   transmitting the response to the client device.

2. The computer-implemented method of claim 1, further comprising:
   ranking the plurality of data centers based on their measured latencies from the probe data.

3. The computer-implemented method of claim 2, further comprising:
   receiving, by the proxy server, updated probe data for the plurality of data centers; and
   updating the ranking of the plurality of data centers based on the updated probe data.

4. The computer-implemented method of claim 1, further comprising:
   receiving second probe data from the plurality of data centers indicating measured latencies for each of the plurality of data centers with a second IP address associated with the origin server, wherein the first data center of the plurality of data centers has a lowest measured latency to the second IP address;
   summing the measured latency of the first data center to the second IP address and the measured latency of a second data center to the second IP address;
   determining that the second IP address associated with the origin server is not the anycast IP address as a result of the sum of the measured latencies of the first data center and the second data center being greater than the threshold value;
   responsive to the determining that the second IP address associated with the origin server is not the anycast IP address, selecting the first data center of the plurality of data centers having the lowest measured latency as a proxying data center;
   transmitting configuration data to the plurality of data centers that indicates the selection of the first data center as the proxying data center.

5. The computer-implemented method of claim 4, wherein selecting the first data center of the plurality of data centers having the lowest measured latency as the proxying data center comprises:
   ranking the plurality of data centers based on their measured latencies from the second probe data; and
   identifying a data center with the lowest measured latency from the ranking.

6. The computer-implemented method of claim 5, further comprising:
   identifying the second data center with a second lowest measured latency from the ranking as a fallback proxying data center.

7. The computer-implemented method of claim 1, wherein the selected proper subset of the plurality of data centers includes at least one data center in each of a plurality of geographically distributed regions.

8. The computer-implemented method of claim 7, wherein the at least one data center in each of the plurality of geographically distributed regions has a greater capacity than other data centers in their respective geographically distributed region.

9. The computer-implemented method of claim 1, wherein the sum of the measured latencies being less than the threshold value indicates that a packet traversed a distance associated with the first data center and the second data center at a speed greater than a minimum possible observable pair of latencies between the first data center and the second data center.

10. A non-transitory machine-readable storage medium that provides instructions that, when executed by a processor, cause said processor to perform operations comprising:
  receiving probe data from a plurality of data centers indicating measured latencies for each of the plurality of data centers with a first IP address associated with an origin server, wherein a first data center of the plurality of data centers has a lowest measured latency to the first IP address;
  summing the measured latency of the first data center to the first IP address and the measured latency of a second data center of the plurality of data centers to the first IP address;
  determining whether the first IP address associated with the origin server is an anycast IP address by comparing a result of the summing of the measured latencies of the first data center and the second data center with a threshold value;
  responsive to the determining that the sum of the measured latencies is below the threshold value,
    identifying the first IP address associated with the origin server as an anycast IP address, and
    selecting a proper subset of the plurality of data centers as proxying data centers for traffic destined to the first IP address regardless of the measured latencies;
  responsive to the determining that the sum of the measured latencies is not below the threshold value,
    identifying the first IP address associated with the origin server as a non-anycast IP address, and
    selecting the first data center of the plurality of data centers having the lowest measured latency to the first IP address as a proxying data center;
  transmitting configuration data to the plurality of data centers that indicates the selection of one or more proxying data centers;
  receiving a request at a proxy server at one of the plurality of data centers to access a resource hosted by the origin server, the request originating from a client device;
  transmitting the request to one of the one or more proxying data centers to access the resource, the access including retrieving the resource from the origin server;
  receiving, at the proxy server, a response to the transmitted request from the one of the one or more proxying data centers that includes the resource; and
  transmitting the response to the client device.

11. The non-transitory machine-readable storage medium of claim 10, wherein selecting the first data center of the plurality of data centers having the lowest measured latency as the proxying data center comprises:
  ranking the plurality of data centers based on their measured latencies from the probe data; and
  identifying a data center with the lowest measured latency from the ranking.

12. The non-transitory machine-readable storage medium of claim 11, further comprising:
  identifying the second data center with a second lowest measured latency from the ranking as a fallback proxying data center.

13. The non-transitory machine-readable storage medium of claim 11, further comprising:
  receiving, by the proxy server, updated probe data for the plurality of data centers; and
  updating the ranking of the plurality of data centers based on the updated probe data.

14. The non-transitory machine-readable storage medium of claim 10, wherein the selected proper subset of the plurality of data centers includes at least one data center in each of a plurality of geographically distributed regions.

15. The non-transitory machine-readable storage medium of claim 14, wherein the at least one data center in each of the plurality of geographically distributed regions has a greater capacity than other data centers in their respective geographically distributed region.

16. The non-transitory machine-readable storage medium of claim 10, wherein the sum of the measured latencies being less than the threshold value indicates that a packet traversed a distance associated with the first data center and the second data center at a speed greater than a minimum possible observable pair of latencies between the first data center and the second data center.

17. An apparatus, comprising:
  a processor;
  a non-transitory machine-readable storage medium coupled with the processor that stores instructions that, when executed by the processor, causes said processor to perform the following:
    receive probe data from a plurality of data centers indicating measured latencies for each of the plurality of data centers with a first IP address associated with an origin server, wherein a first data center of the plurality of data centers has a lowest measured latency to the first IP address;
    sum the measured latency of the first data center to the first IP address and the measured latency of a second data center of the plurality of data centers to the first IP address;
    determine whether the first IP address associated with the origin server is an anycast IP address by comparing a result of the summing of the measured latencies of the first data center and the second data center with a threshold value;
    responsive to the determining that the sum of the measured latencies is below the threshold value,
      identify the first IP address associated with the origin server as an anycast IP address, and
      select a proper subset of the plurality of data centers as proxying data centers for traffic destined to the first IP address regardless of the measured latencies;
    responsive to the determining that the sum of the measured latencies is not below the threshold value,
      identify the first IP address associated with the origin server as a non-anycast IP address, and
      select the first data center of the plurality of data centers having the lowest measured latency to the first IP address as a proxying data center;

transmit configuration data to the plurality of data centers that indicates the selection of one or more proxying data centers;

receive a request at a proxy server at one of the plurality of data centers to access a resource hosted by the origin server, the request originating from a client device;

transmit the request to one of the one or more proxying data centers to access the resource, the access including retrieving the resource from the origin server;

receive, at the proxy server, a response to the transmitted request from the one of the one or more proxying data centers that includes the resource; and transmit the response to the client device.

18. The apparatus of claim 17, wherein selecting the first data center of the plurality of data centers having the lowest measured latency as the proxying data center further causes said processor to:

rank the plurality of data centers based on their measured latencies from the probe data; and identify a data center with the lowest measured latency from the ranking.

19. The apparatus of claim 18, wherein the instructions further cause said processor to perform the following:

identify the second data center with a second lowest measured latency from the ranking as a fallback proxying data center.

20. The apparatus of claim 18, wherein the instructions further cause said processor to perform the following:

receive, by the proxy server, updated probe data for the plurality of data centers; and update the ranking of the plurality of data centers based on the updated probe data.

21. The apparatus of claim 17, wherein the selected proper subset of the plurality of data centers includes at least one data center in each of a plurality of geographically distributed regions.

22. The apparatus of claim 21, wherein the at least one data center in each of the plurality of geographically distributed regions has a greater capacity than other data centers in their respective geographically distributed region.

23. The apparatus of claim 17, wherein the sum of the measured latencies being less than the threshold value indicates that a packet traversed a distance associated with the first data center and the second data center at a speed greater than a minimum possible observable pair of latencies between the first data center and the second data center.

* * * * *